US005475516A

United States Patent [19]

Yoshizawa et al.

[11] Patent Number: 5,475,516

[45] Date of Patent: Dec. 12, 1995

[54] ALPHANUMERIC SYMBOL FORMED BY A 3×5 MATRIX WITH TWO LONGITUDINALLY BISECTED PIXELS

[75] Inventors: Osamu Yoshizawa; Yoshio Aoyagi; Hiroshi Wakimoto; Tatsuya Fukuda; Akira Kawahara, all of Saitama, Japan

[73] Assignee: Pioneer Electronic Corp., Tokyo, Japan

[21] Appl. No.: 120,432

[22] Filed: Sep. 14, 1993

[30] Foreign Application Priority Data

Sep. 18, 1992 [JP] Japan .............................. 4-071551 U

[51] Int. Cl.$^6$ .............................................. G02F 1/1343

[52] U.S. Cl. ................................ 359/54; 359/89; 345/103

[58] Field of Search ................................ 359/54, 61, 89; 345/103

[56] References Cited

FOREIGN PATENT DOCUMENTS

| | | | |
|---|---|---|---|
| 146285 | 10/1986 | European Pat. Off. . | |
| 421517 | 4/1991 | European Pat. Off. . | |
| 62-209416 | 9/1987 | Japan | 359/89 |

*Primary Examiner*—William L. Sikes
*Assistant Examiner*—Ron Trice
*Attorney, Agent, or Firm*—Nikaido Marmelstein Murray & Oram

[57] ABSTRACT

A liquid crystal display includes a plurality of pixels arranged in a matrix. The matrix is formed by five rows and three columns. A pixel at a predetermined position is bisected.

3 Claims, 6 Drawing Sheets

ALPHANUMERIC SYMBOL FORMED BY A 3×5 MATRIX WITH TWO LONGITUDINALLY BISECTED PIXELS

FIELD OF THE INVENTION

The present invention relates to a display such as a liquid crystal display (LCD) and more particularly to a display provided with a plurality of dot matrix units for expressing alphanumeric symbols and graphic images.

BACKGROUND OF THE INVENTION

In an LCD, a numeral is generally shown by a combination of seven segments as shown in FIG. 7. The seven-segment display can express numerical characters from zero to nine. A fourteen-segment display shown in FIG. 8 can further indicate alphabets.

In a dot matrix display, each character is indicated on a matrix comprising pixels (segments) arranged in five rows by seven columns, totaling in 35 pixels, as shown in FIG. 9. Since numerous pixels are provided, the dot matrix display is able to indicate not only numerals and alphabets, but also a graphic image, such as a frequency response graph in a graphic equalizer. Hence, the dot matrix display is advantageous in that a large quantity of information can be shown on the display having a limited area.

However, a large number of pixels must be provided when indicating eight to nine characters. Moreover, in order to show a graph with the dots, a display requires a great deal of pixels, for example 200 rows by 16 columns. Namely, as much as 3200 pixels are required. As shown in FIG. 10, in order to drive an LCD having a large number of pixels, at least three driver ICs 2 are necessary. Therefore, the driving circuit is complicated in construction, and hence the manufacturing cost is increased.

SUMMARY OF THE INVENTION

An object of the present invention is to provide a display with reduced number of pixels so that a driving circuit thereof is simplified and the manufacturing cost may be reduced.

According to the present invention there is provided a dot matrix display having a plurality of pixels wherein a display unit for representing a character comprises pixels arranged in a matrix of five rows by three columns. Pixels at predetermined positions of each unit is bisected.

Thus, although each unit comprises only seventeen pixels for representing a character, the bisected pixels renders it possible to discern each character.

The other objects and features of these invention will become understood from the following description with reference to the accompanying drawings.

DETAILED DESCRIPTION OF THE PREFERRED EMBODIMENT

Figure 1:
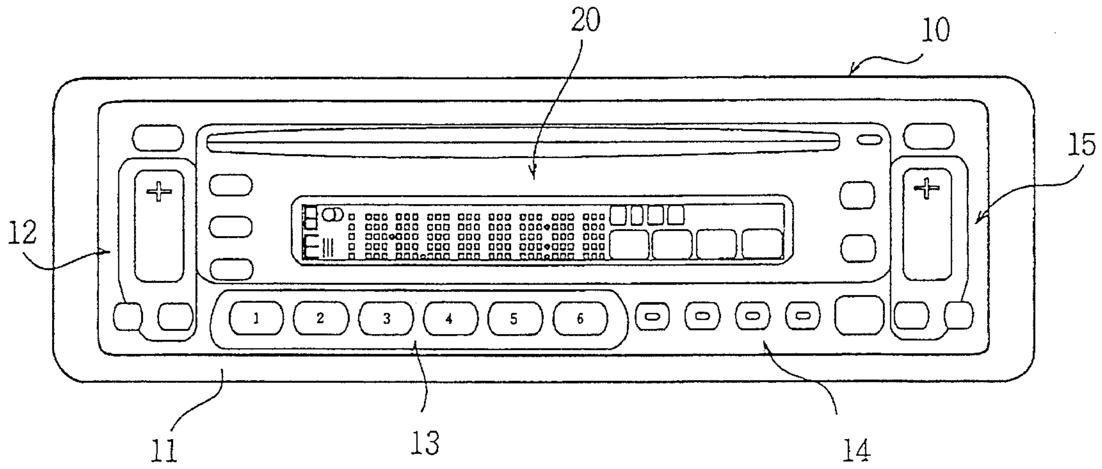
FIG. 1 is an elevational view of a car stereo to which the present invention is applied.

Referring to FIG. 1, a car stereo to which the present invention is applied has a body 10 having an operation panel 11. The operation panel 11 has an LCD 20 and various function keys 12, 13, 14 and 15 disposed around the LCD 20.

Figure 2:
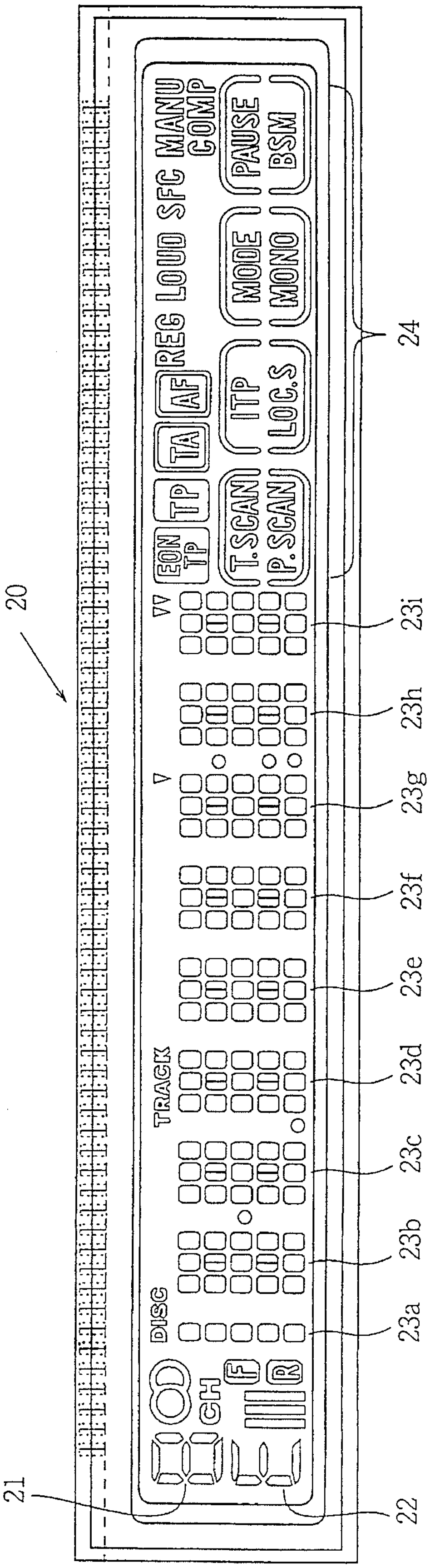
FIG. 2 is an enlarged diagram of a display provided on the car stereo of FIG. 1.

Referring to FIG. 2, the display 20 has a seven-segment display 21 and a five-segment display 22 for indicating preset channel numerals at the left side thereof. At the right side of the display 20 are provided a plurality of indicators 24 which show the current operational function of the car stereo.

Figure 3:
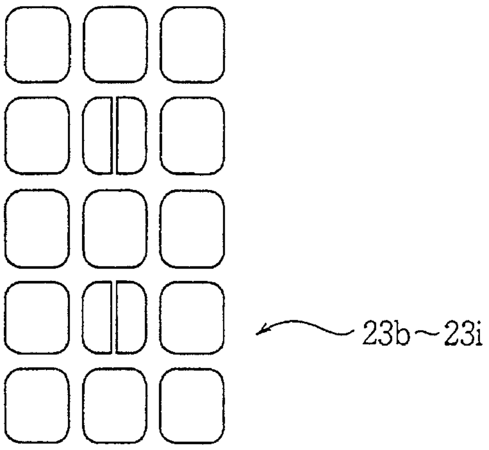
FIG. 3 is an illustration showing a dot matrix display unit of the display of FIG. 2.

Between the displays 21, 22 and 24 are provided nine dot matrix display units 23*a* to 23*i*. The left end matrix unit 23*a* comprises a column of five pixels for mostly indicating the numeral one, and each of the other eight matrix units 23*b* to 23*i* comprises pixels arranged in five rows by three columns. Each of the pixels in the second and fourth row in the center column in the units 23*b* to 23*i* is bisected in the longitudinal direction to form half pixels as shown in FIG. 3. Namely, the total of the pixels of each of the dot matrix units 23*b* to 23*i* is seventeen, and the total of the pixels in the LCD is 141 (5+17×8).

Figure 4:
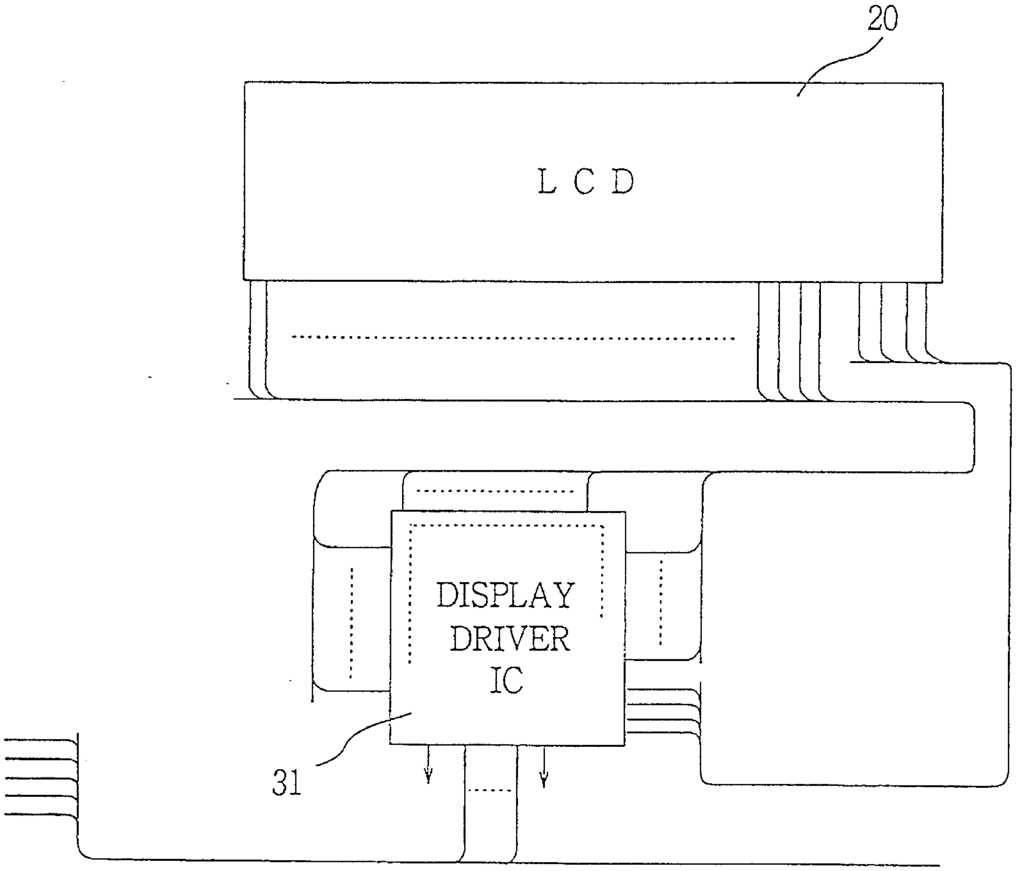
FIG. 4 is a diagram showing a driving circuit of the display.

Referring to FIG. 4, each pixel of the LCD 20 is connected to a single display driver 31.

FIGS. 5*a* to 5*o* and FIGS. 6*a* and 6*b* show various alphanumeric symbols and graphic images which can be represented on the display 20. FIGS. 5*b* to 5*e* show alphabets A to Z expressed on one dot matrix unit. In the letters G, K, N. Q, R and V, half pixels are energized to appropriately express the shape of each letter. Thus the alphabets can be discerned from one another with ease.

Figure 5A:
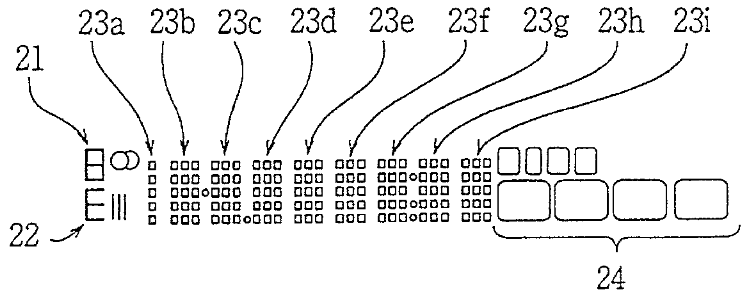
FIG. 5*a* is a diagram showing an arrangement of the display units.
Figure 5B:
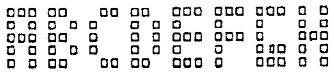
FIGS. 5*b* to 5*o* show various examples of characters shown on the dot matrix display.
Figure 5C:
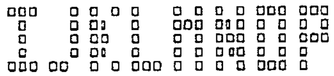
Figure 5D:
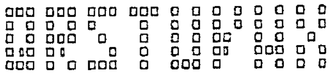
Figure 5E:
Figure 5F:
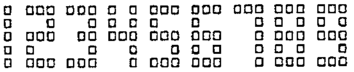
Figure 5G:
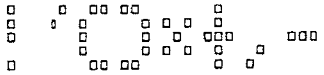
Figure 5H:
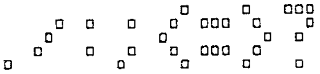

FIG. 5*f* show numerals one to nine, which can be clearly discerned without using the half pixels. FIGS. 5*g* to 5*j* show punctuation marks and mathematical symbols indicated on the display 20. For example, exclamation mark (!), apostrophe ('), wherein a half pixel is activated, brackets ([, ]), multiplication (×), addition (+), comma (,), and subtraction (−) are expressed on the display.

Figure 5I:
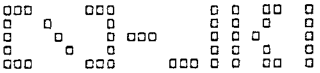
Figure 5J:
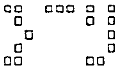
Figure 5K:
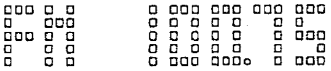
Figure 5L:
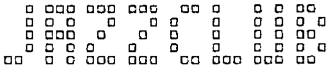
Figure 5M:
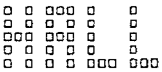
Figure 5N:
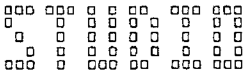
Figure 5O:
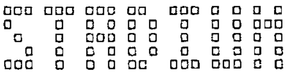

FIGS. 5*k* to 5*i* show examples for indicating on the eight dot matrix units the operational modes of the car stereo using alphanumeric characters. FIG. 5*k* show an FM set frequency and FIGS. 5*l* to 5*o* show ambient modes.

Figure 6A:
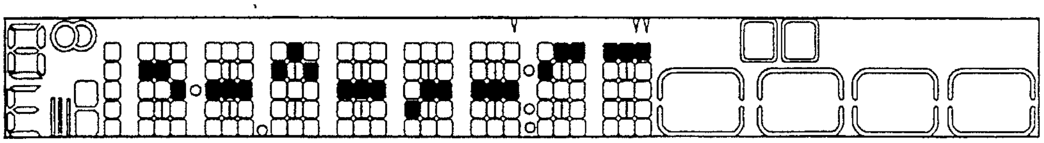
FIGS. 6*a* and 6*b* show examples of graphic images shown on the dot matrix display.
Figure 6B:
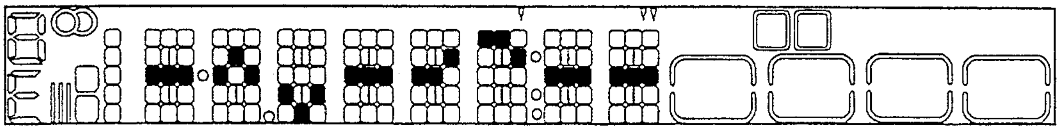
Figure 7:
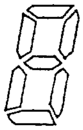
FIG.7 PRIOR ART
FIG. 7 is an illustration of a seven-segment numerical display.
Figure 8:
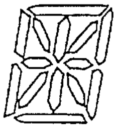
FIG.8 PRIOR ART
FIG. 8 is an illustration of a fourteen-segment alphanumerical display.
Figure 9:
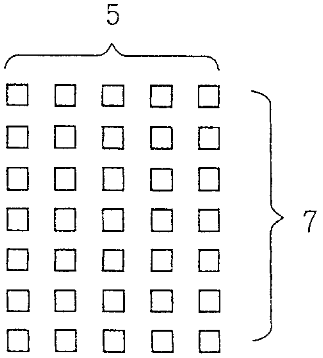
FIG.9 PRIOR ART
FIG. 9 is an illustration of a conventional dot matrix display unit.
Figure 10:
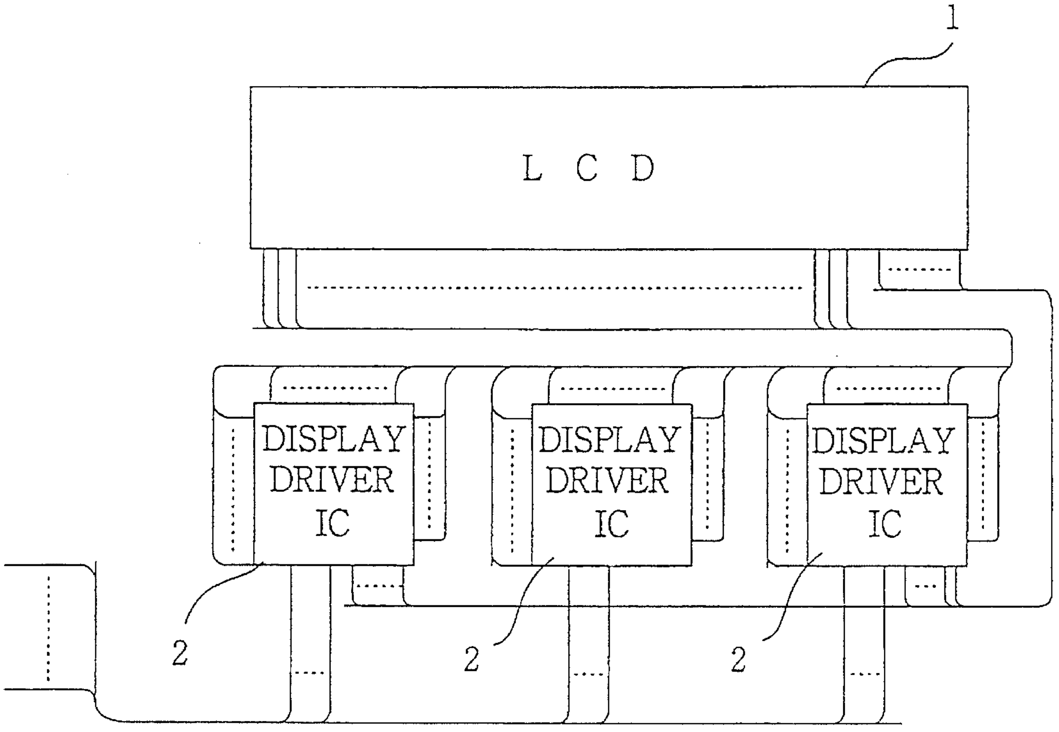
FIG.10 PRIOR ART
FIG. 10 is a diagram showing a driving circuit of a conventional display.

FIGS. 6*a* and 6*b* show the LCD 20 when in a mode for a display of a graphic equalizer. Namely, the frequency characteristics of the car stereo are graphically shown.

From the foregoing it will be understood that the present invention provides a dot matrix LCD wherein some of the pixels forming the display is bisected to form half pixels. Thus, various characters can be expressed on the display with a small number of pixels. More particularly, whereas a conventional display required 3200 pixels, the display of the present invention requires only 141 pixels, or about one twenty-sixth of the conventional display. Hence, a single driver IC is sufficient to actuate the pixels, thereby simplifying the driving circuit of the LCD, and reducing the manufacturing cost.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A display comprising:

a plurality of pixels arranged in a matrix, the matrix being formed by five rows and three columns; and the pixels including longitudinally bisected pixels, the bisected pixels being disposed at second and fourth rows in a center column.

2. The display according to claim 1 wherein each couple of bisected pixels occupies a space with an area of which is substantially equal to that of a non-bisected pixel.

3. The display according to claim 1 wherein each of the pixels is a liquid crystal element.

* * * * *